(12) United States Patent
Hill et al.

(10) Patent No.: US 6,264,234 B1
(45) Date of Patent: Jul. 24, 2001

(54) INFLATABLE VEHICLE OCCUPANT PROTECTION DEVICE

(75) Inventors: Bruce R. Hill, Bloomfield Hills, MI (US); Kenneth D. Brannon, Mesa, AZ (US)

(73) Assignee: TRW Vehicle Safety Systems Inc./ TRW Inc., Lyndhurst, OH (US)

( * ) Notice: Subject to any disclaimer, the term of this patent is extended or adjusted under 35 U.S.C. 154(b) by 0 days.

(21) Appl. No.: 09/436,336

(22) Filed: Nov. 8, 1999

(51) Int. Cl.⁷ .................................................. B60R 21/16
(52) U.S. Cl. ..................................... 280/730.2; 280/743.1; 280/729
(58) Field of Search ............................. 280/730.2, 729, 280/730.1, 749, 743.1, 743.2

(56) References Cited

U.S. PATENT DOCUMENTS

| | | |
|---|---|---|
| 3,638,755 | 2/1972 | Sack . |
| 3,774,936 * | 11/1973 | Barnett et al. ............... 280/730.1 |
| 3,814,458 | 6/1974 | Acs . |
| 3,897,961 * | 8/1975 | Leising et al. ............... 280/730.1 |
| 5,464,246 | 11/1995 | Castro et al. . |
| 5,480,181 * | 1/1996 | Bark et al. .................. 280/730.2 |
| 5,505,485 | 4/1996 | Breed . |
| 5,524,926 | 6/1996 | Hirai et al. . |
| 5,630,620 | 5/1997 | Hirai et al. . |
| 5,707,075 | 1/1998 | Kraft et al. . |
| 5,707,711 | 1/1998 | Kitamura . |
| 5,722,685 * | 3/1998 | Eyrainer ..................... 280/730.2 |
| 5,746,446 | 5/1998 | Breed et al. . |
| 5,788,270 | 8/1998 | Haland et al. . |
| 5,803,495 * | 9/1998 | Jackson et al. ............. 280/743.1 |
| 5,863,068 | 1/1999 | Breed . |
| 5,865,462 * | 2/1999 | Robins et al. .............. 280/730.2 |
| 5,899,491 * | 5/1999 | Tschaeschke .............. 280/730.2 |
| 5,924,723 * | 7/1999 | Brantman et al. .......... 280/730.2 |
| 6,042,141 * | 3/2000 | Welch et al. ............... 280/729 |
| 6,073,961 * | 6/2000 | Bailey et al. .............. 280/730.2 |
| 6,095,551 * | 8/2000 | O'Docherty ............... 280/730.2 |
| 6,152,481 * | 11/2000 | Webber et al. ............. 280/730.2 |

* cited by examiner

Primary Examiner—Kenneth R. Rice
Assistant Examiner—Cynda Jasmin
(74) Attorney, Agent, or Firm—Tarolli, Sundheim, Covell, Tummino & Szabo L.L.P.

(57) ABSTRACT

Apparatus (10) for helping to protect an occupant of a vehicle (12) which has a side structure (16) comprises a vehicle occupant protection device (14) that is inflatable into a position between the side structure of the vehicle and a vehicle occupant. The vehicle occupant protection device (14) includes an inflatable bladder (40) contained within an outer shell (42) and completely unattached to the outer shell. An inflation fluid source (24) provides inflation fluid for inflating the inflatable bladder (40). The inflatable bladder (40) is made of gas impermeable material having overlying portions (48) that are sealed together in an airtight manner by a radio frequency weld (50). The outer shell (42) provides structural support for the inflatable bladder (40).

8 Claims, 3 Drawing Sheets

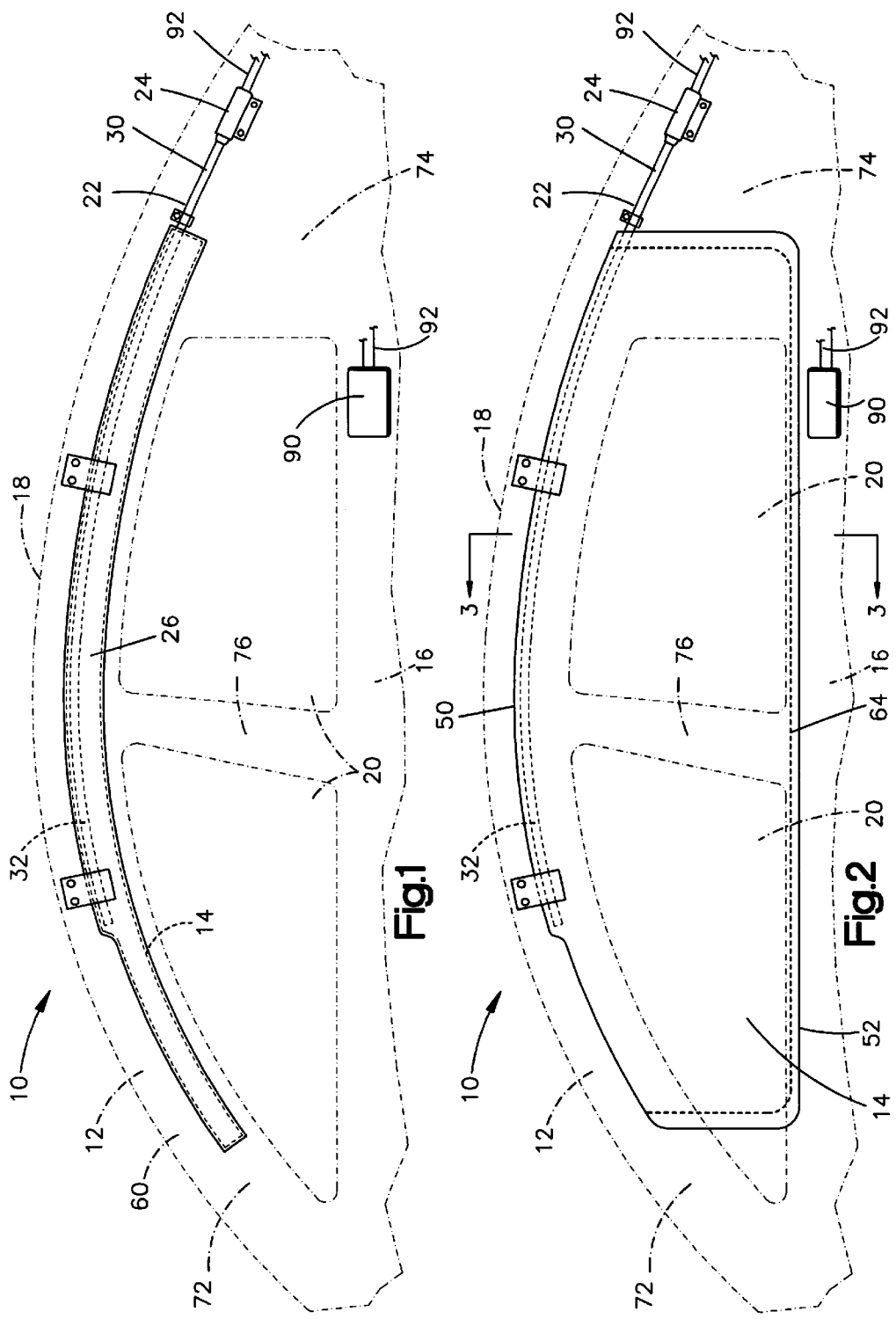

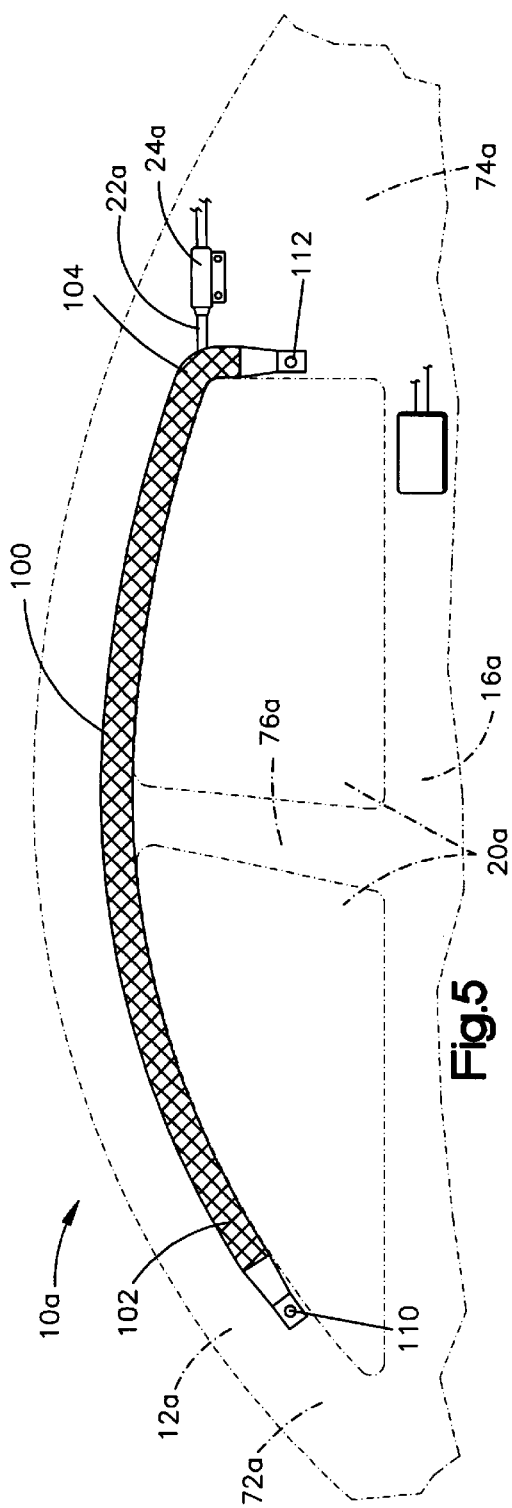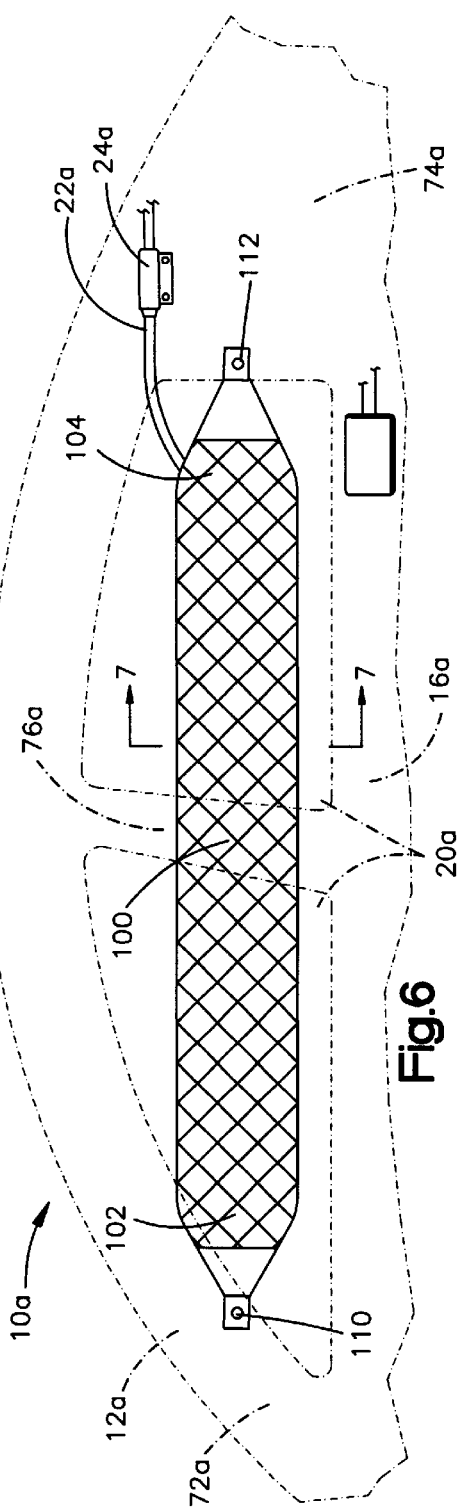

INFLATABLE VEHICLE OCCUPANT PROTECTION DEVICE

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. Particular types of inflatable vehicle occupant protection devices are inflatable curtains and inflatable tubes that inflate from the roof of the vehicle downward inside the passenger compartment between a vehicle occupant and the side structure of the vehicle in the event of a side impact or rollover. Such inflatable vehicle occupant protection devices are inflated from a deflated condition by inflation fluid directed from an inflator to the vehicle occupant protection device through a fill tube.

SUMMARY OF THE INVENTION

The present invention relates to an apparatus for helping to protect an occupant of a vehicle that has a side structure. The apparatus comprises a vehicle occupant protection device that is inflatable into a position between the side structure of the vehicle and a vehicle occupant. The vehicle occupant protection device includes an inflatable bladder contained within an outer shell and completely unattached to the outer shell. An inflation fluid source provides inflation fluid for inflating the inflatable bladder. The inflatable bladder is made of gas impermeable material and has overlying portions that are sealed together in an airtight manner by a radio frequency weld. The outer shell provides structural support for the inflatable bladder.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition;

FIG. 2 is a schematic view of the vehicle safety apparatus of FIG. 1 in an inflated condition;

FIG. 5 is a schematic view of an inflatable vehicle safety apparatus illustrating the safety apparatus in a deflated condition, according to a second embodiment of the present invention;

FIG. 6 is a schematic view of the vehicle safety apparatus of FIG. 5 in an inflated condition.

DESCRIPTION OF PREFERRED EMBODIMENTS

Figure 3:
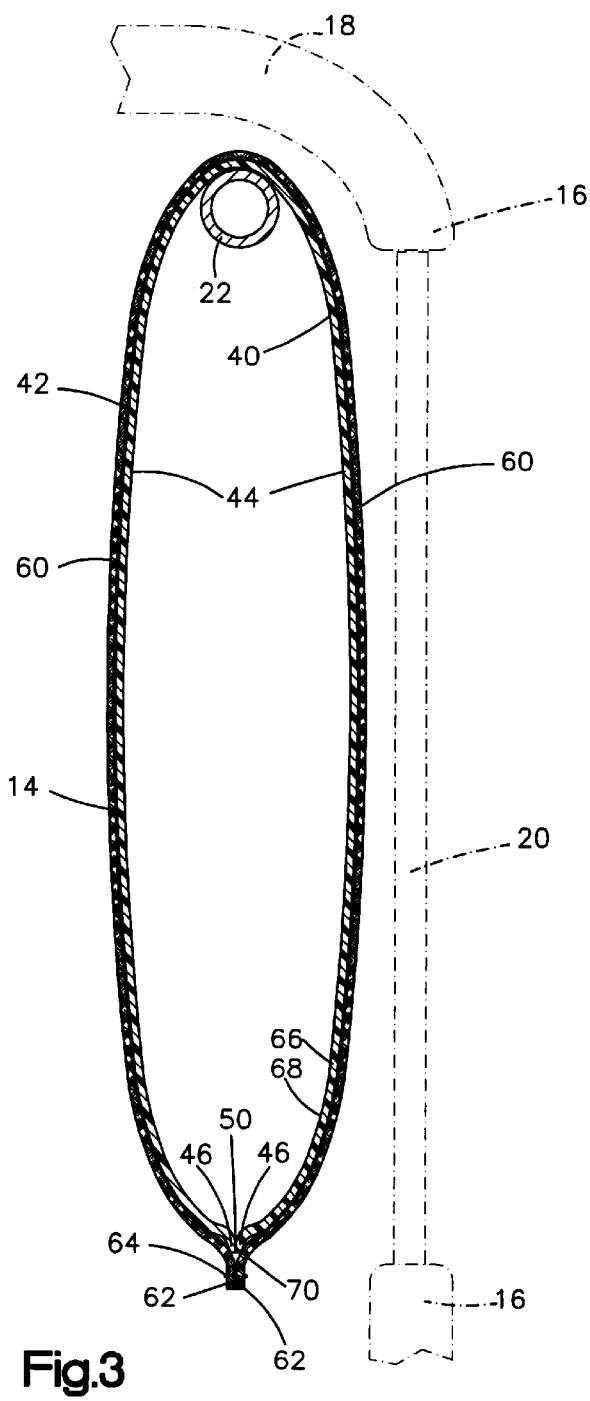
FIG. 3 is a sectional view the vehicle safety apparatus taken generally along line 3—3 in FIG. 2.

As representative of the present invention, a vehicle safety apparatus 10 helps to protect an occupant of a vehicle 12. As shown in FIGS. 1 and 2, the safety apparatus 10 includes an inflatable curtain 14 mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32, which is disposed in the inflatable curtain 14 (FIG. 2). The second end portion 32 of the fill tube 22 has a plurality of openings (not shown) that provide fluid communication between the fill tube 22 and the inflatable curtain 14. It will be recognized by those skilled in the art, however, that the inflation fluid may be directed from the inflator 24 into the inflatable curtain 14 without the use of a fill tube 22.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The safety apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As illustrated in FIG. 3, the inflatable curtain 14 comprises an inflatable bladder 40 contained within an outer shell 42. The inflatable bladder 40 is formed from a sheet of material that is folded over to form overlying bladder panels 44. Overlapping portions 46 (FIGS. 3 and 4) of the bladder panels 44 are secured together by a radio frequency weld 50 along at least a portion of the periphery 52 (FIG. 2) of the inflatable curtain 14.

Figure 4:
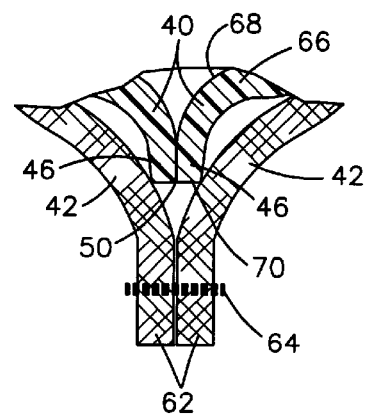
FIG. 4 is an enlarged view of a portion of the vehicle safety apparatus of FIG. 3.

The outer shell 42 (FIG. 3) is formed from a sheet of material that is folded over, around the inflatable bladder 40, to form shell panels 60 that overlie the bladder panels 44. Portions 62 (FIGS. 3 and 4) of the shell panels 60 are secured together by stitching 64 (FIGS. 2–4). The stitching 64 extends along the periphery 52 of the inflatable curtain 14 (FIG. 2).

The construction of the inflatable curtain 14 (FIGS. 3 and 4) is such that the inflatable bladder 40 is contained within the outer shell 42 and completely unattached to the outer shell. This allows the inflatable bladder 40 to move relative to the outer shell 42 as the inflatable curtain 14 inflates and as impacts with the curtain occur.

It will be recognized by those skilled in the art that the inflatable curtain 14 may have alternative constructions. For example, the bladder panels 44 and the shell panels 60 could be formed from separate sheets of material arranged in an overlying manner and secured together along the entire periphery 52 (FIG. 2) of the panels to form the inflatable curtain 14.

The inflatable bladder 40 and the outer shell 42 combine to form a construction that is airtight and structurally reinforced. The radio frequency weld 50 helps to prevent the inflatable bladder 40 from leaking. The outer shell 42 bears the stresses created by the inflation of the inflatable bladder 40 and impacts with the bladder.

The inflatable bladder 40 (FIG. 3) is constructed of a gas impermeable material that is capable of being bonded by radio frequency welding. For example, the inflatable bladder 40 may be constructed of a fabric material with an elastomeric coating, such as a urethane coating. The inflatable bladder 40 may also be constructed of an elastomeric film, such as a urethane film. The outer shell 42 is constructed of a material that is relatively strong. For example, the outer shell 42 may be constructed of a fabric such as nylon.

In the illustrated embodiment, the material used to construct the inner bladder 40 is a fabric 66 having an elastomeric coating 68. The fabric 66 is folded over such that the portions of the coating 68 on the bladder panels 44 are positioned adjacent to each other. The radio frequency weld 50 melts and bonds the adjacent portions of the coating 66 to form an air-tight seam 70.

Construction of the inflatable bladder 40 using the radio frequency welding technique is advantageous over known methods, such as hot-melting. Where, as in the illustrated embodiment, the fabric 66 with an elastomeric coating 68 is used to construct the inflatable bladder 40, the radio frequency welding technique prevents the fabric from being damaged when the adjacent portions of the coating are melted. This is because radio frequency welding does not rely on conducting heat through the fabric 66 in order to melt and bond the elastomeric coating 68.

Hot-melting techniques would involve the use of a device, such as an iron, to heat the fabric 66 such that heat is conducted to the adjacent portions 68 of the elastomeric coating 68 in order to melt the coating. This method, however, may result in damaging the fabric 66 and, thus, limits type of material that can be used to construct the inflatable bladder 40. For example, certain types of nylon fabric may not be useable because the nylon could melt before the radio frequency weld 50 is formed.

The radio frequency welding technique uses an ultrasonic signal to heat, melt, and bond the adjacent portions of the coating 68. The ultrasonic signal can be directed to the coating 68 such that the coating is heated prior to fabric 66. Thus, the radio frequency weld 50 is formed before the fabric 66 becomes heated to a point where damage occurs. This allows the inflatable bladder 40 to be constructed of fabrics that may otherwise be impossible to use in conjunction with known techniques, such as hot-melting.

The inflatable bladder 40 may have larger dimensions than the outer shell 42. Expansion of the inflatable bladder 40 during inflation will thus be limited or restrained by the outer shell 42. This will help to ensure that the outer shell 42 bears the pressure exerted on the expanding bladder 40 as the bladder inflates and as impacts with the inflatable curtain 14 occur.

The vehicle 12 includes a sensor mechanism 90 (shown schematically in FIGS. 1 and 2) for sensing a side impact to the vehicle 12 and/or a rollover of the vehicle 12. The sensor mechanism 90 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 90 provides an electrical signal over lead wires 92 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIGS. 2 and 3) inflates away from the roof 18, in a downward direction with respect to the direction of forward travel of the vehicle 12, into the position illustrated in FIG. 2.

The inflatable curtain 14, when inflated, extends along the side structure 16 of the vehicle 12 and is positioned between the side structure and any occupant of the vehicle. In the inflated condition, the inflatable curtain 14 is positioned adjacent to the side structure 16 of the vehicle 12. In the embodiment illustrated in FIG. 2, the inflatable curtain 14 extends between an A pillar 72 and a C pillar 74 of the vehicle 12 and overlies at least a portion of the A pillar, C pillar, and a B pillar 76 of the vehicle. The inflatable curtain 14, when inflated, helps to protect a vehicle occupant in the event of a vehicle rollover or a side impact to the vehicle 12.

Those skilled in the art will recognize that the inflatable curtain 14 may be configured so as to extend along any desired portion of a vehicle side structure. For example, in a vehicle having an A, B, C, and D pillars (not shown), the inflatable curtain 14 could extend between the A pillar and the D pillar or along a portion of the side structure between the A pillar and the D pillar.

The construction of the inflatable curtain 14 helps to ensure that the curtain will remain inflated throughout the duration of a side impact to the vehicle 12 or a vehicle rollover. The outer shell 42 limits the expansion of the inflatable bladder 40 during inflation of the inflatable curtain 14. The outer shell 42 also provides structural support for the inflatable bladder 40, which helps to prevent the bladder from bursting or tearing.

The radio frequency weld 50 helps to prevent inflation fluid from leaking from the inflatable bladder 40 through the seam 70 when the curtain 14 is inflated and when impacts with the curtain occur. The outer shell 42 reinforces the seam 70 by helping to prevent the portions 46 of the bladder panels 44 from pulling apart. The outer shell 42 also helps to prevent the inflatable bladder 40 from bursting or tearing.

Figure 7:
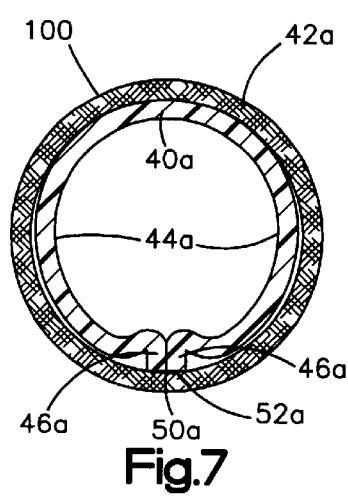
FIG. 7 is a sectional view the vehicle safety apparatus taken generally along line 7—7 in FIG. 6.

A second embodiment of the present invention is illustrated in FIGS. 5–7. The second embodiment of the invention is similar to the first embodiment of the invention illustrated in FIGS. 1–4. Accordingly, numerals similar to those of FIGS. 1–4 will be utilized in FIGS. 5–7 to identify similar components, the suffix letter "a" being associated with the numerals of FIG. 5–7 to avoid confusion.

The safety apparatus 10a (FIGS. 5–7) of the second embodiment is identical to the safety apparatus 10 (FIGS. 1–4), except that the shape of the inflatable bladder 40a and the outer shell 42a (FIG. 7) differs from the shape of the inflatable bladder 40 and the outer shell 42 (FIG. 3). Specifically, the safety apparatus 10 of FIGS. 1–4 comprises an inflatable curtain 14, whereas the safety apparatus 10a of FIGS. 5–7 comprises an inflatable tube 100.

The inflatable tube 100 (FIGS. 5 and 6) is generally elongated and has first and second opposite ends 102 and 104. The first end 102 of the inflatable tube 100 is connected to the side structure 16a of the vehicle 12a at a first location 110 on or near the A pillar 72a of the vehicle 12a. The second end 104 of the inflatable tube 100 is connected to the side structure 16a of the vehicle 12a at a second location 112 on or near the C pillar 74a of the vehicle 12a. The inflatable tube 100 is connected in fluid communication with the inflator 24a by a fill tube 22a which comprises a flexible conduit, such as a hose.

It will be recognized by those skilled in the art that it may be desirable to provide separate inflatable tubes 100 that extend adjacent to the front and rear windows 20a of the vehicle 12a, respectively. In this instance, one inflatable tube 100 may be connected to the side structure 16 of the vehicle 12 between the A pillar 72a and the B pillar 76a, and one inflatable tube 100 may be connected to the vehicle between the B pillar 76a and the C pillar 74a.

As illustrated in FIG. 7, the inflatable tube 100 comprises an inflatable bladder 40a contained within an outer shell 42a. The inflatable bladder 40a is formed from a sheet of material that is folded over to form overlying bladder panels 44a. Overlapping portions 46a of the bladder panels 44a are secured together by a radio frequency weld 50a along at least a portion of the periphery 52a of the inflatable tube 100.

The outer shell 42a is formed from a length of braided material, such as a fabric, in the form of a seamless tube. The inflatable bladder 40a is completely unattached to the outer shell 42a along the length of the inflatable tube 100.

In the uninflated condition (FIG. 5), the inflatable tube 100 has a given length and a given diameter. Upon inflation, the diameter of the inflatable tube 100 (FIG. 6) increases, and the length of the inflatable tube 100 decreases. Thus, when inflated, the inflatable tube 100 is tensioned between the first and second locations 110 and 112. The inflatable tube 100, when inflated, is positioned along the side structure 16a of the vehicle 12a between the side structure and any occupant of the vehicle.

The construction of the inflatable tube 100 helps to ensure that the tube will remain inflated throughout the duration of a side impact to the vehicle 12a or a vehicle rollover. The outer shell 42a limits the expansion of the inflatable bladder 40a during inflation of the inflatable tube 100. The outer shell 42a provides structural support for the inflatable bladder 40a, which helps to prevent the bladder from bursting or tearing. The outer shell 42a also helps to prevent the portions 46a of the bladder panels 44a from pulling apart and breaking the radio frequency weld 50a when the bladder is inflated. The radio frequency weld 50a helps to prevent inflation fluid from leaking from the inflatable bladder 40a when the bladder is inflated.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure, said apparatus comprising:

a vehicle occupant protection device that is inflatable into a position between the side structure of the vehicle and a vehicle occupant, said vehicle occupant protection device comprising an inflatable bladder contained within an outer shell and being completely unattached to said outer shell; and an inflation fluid source that provides inflation fluid for inflating said inflatable bladder;

said inflatable bladder being made of gas impermeable material having overlying portions with a radio frequency weld sealing said overlying portions together in an airtight manner;

said outer shell comprising a structural reinforcement for said inflatable bladder which provides structural support for said inflatable bladder.

2. Apparatus as defined in claim 1, further including a fill tube in fluid communication with said inflatable bladder and extending into said inflatable bladder, said inflation fluid source being in fluid communication with said fill tube, said inflation fluid source, when actuated, providing inflation fluid to said fill tube, said fill tube directing said inflation fluid into said inflatable bladder to inflate said inflatable bladder.

3. Apparatus as defined in claim 1, wherein said vehicle occupant protection device is an inflatable curtain having a stored position extending along the side structure adjacent to a roof of the vehicle, said inflatable curtain being deployed away from the vehicle roof into said position between the side structure of the vehicle and the vehicle occupant.

4. Apparatus as defined in claim 1, wherein said vehicle occupant protection device is an inflatable tubular structure, said inflatable bladder comprising an inflatable tube and said outer shell comprising a braided tubular structure.

5. Apparatus as defined in claim 4, wherein said inflatable tubular structure has a stored position extending along the side structure adjacent to a roof of the vehicle, said inflatable tubular structure being inflated away from the vehicle roof into said position between the side structure of the vehicle and a vehicle occupant.

6. Apparatus as defined in claim 1, further comprising a sensor for sensing a vehicle condition for which deployment of said vehicle occupant protection device is desired, said sensor actuating said inflation fluid source to provide inflation fluid to inflate said inflatable bladder.

7. Apparatus as defined in claim 1, wherein said inflation fluid source comprises an inflator which is actuatable to inflate said inflatable bladder.

8. Apparatus for helping to protect an occupant of a vehicle that has a side structure, said apparatus comprising:

a vehicle occupant protection device that is inflatable into a position between the side structure of the vehicle and a vehicle occupant, said vehicle occupant protection device comprising an inflatable bladder contained within an outer shell and being completely unattached to said outer shell; and an inflation fluid source that provides inflation fluid for inflating said inflatable bladder;

said inflatable bladder being made of gas impermeable material having overlying portions with a radio frequency weld sealing said overlying portions together in an airtight manner;

said outer shell comprising a structural reinforcement for said inflatable bladder which provides structural support for said inflatable bladder, said inflatable bladder and said outer shell, when inflated, having inflatable portions which overlie at least a portion of an A pillar, B pillar and a C pillar of the vehicle.

* * * * *